US010001326B2

United States Patent
Fu et al.

(10) Patent No.: US 10,001,326 B2
(45) Date of Patent: Jun. 19, 2018

(54) ELECTRIC POWER PEAK-SHAVING AND COMBINED HEAT AND POWER WASTE HEAT RECOVERY DEVICE AND OPERATION METHOD THEREOF

(71) Applicant: Tsinghua University, Beijing (CN)

(72) Inventors: Lin Fu, Beijing (CN); Yi Jiang, Beijing (CN); Yanting Wu, Beijing (CN); Jian Sun, Beijing (CN); Shigang Zhang, Beijing (CN); Xiling Zhao, Beijing (CN); Changlei Xiao, Beijing (CN); Weiwei Yang, Beijing (CN); Daoke Tang, Beijing (CN); Xin Qi, Beijing (CN)

(73) Assignee: Tsinghua University, Beijing (CN)

( * ) Notice: Subject to any disclaimer, the term of this patent is extended or adjusted under 35 U.S.C. 154(b) by 0 days. days.

(21) Appl. No.: 14/902,095

(22) PCT Filed: Feb. 28, 2014

(86) PCT No.: PCT/CN2014/000187
§ 371 (c)(1),
(2) Date: Dec. 30, 2015

(87) PCT Pub. No.: WO2015/127572
PCT Pub. Date: Sep. 3, 2015

(65) Prior Publication Data
US 2016/0370122 A1    Dec. 22, 2016

(51) Int. Cl.
*F28D 17/00*    (2006.01)
*F28D 19/00*    (2006.01)
(Continued)

(52) U.S. Cl.
CPC ........... *F28D 20/0034* (2013.01); *F24D 3/18* (2013.01); *F24D 11/0235* (2013.01);
(Continued)

(58) Field of Classification Search
CPC ................ F28D 20/0034; F28D 17/04; F28D 2020/0082; F25B 30/06
(Continued)

(56) References Cited

U.S. PATENT DOCUMENTS 5,934,076 A * 8/1999 Coney .................... F02G 1/044
                                                    60/617
6,481,234 B2 * 11/2002 Ma ........................ F25B 30/02
                                                    62/160
(Continued)

FOREIGN PATENT DOCUMENTS

CN    201964501    9/2011
CN    201973776    9/2011
(Continued)

OTHER PUBLICATIONS

International Search Report dated Oct. 27, 2014, issued in International patent application PCT/CN2014/000187.

*Primary Examiner* — Len Tran
*Assistant Examiner* — Paul Alvare
(74) *Attorney, Agent, or Firm* — Baker & Hostetler LLP

(57) ABSTRACT

An inner power plant portion and a heat exchange station portion. The inner power plant portion includes a heat exchanger, a waste heat recovery electric heat pump, an energy-storing electric heat pump, high/low temperature water storing tanks, a heating network heater, a valve and a circulating water pump; the heat exchange station portion includes high/low temperature water storing tanks, an electric heat pump, a heat exchanger, a valve and a circulating water pump; as for the operating method of the device, the device can operate in periods of an electrical load trough, an electrical load flat and an electrical load peak respectively through combination of different valve switches, the high temperature water storing tank is used for balancing the difference between system heat supply amount and heating (Continued)

load, the low temperature water storing tank is used for stabilizing steam exhaust waste heat recovery amount.

8 Claims, 2 Drawing Sheets

(51) Int. Cl.
*F28D 20/00* (2006.01)
*F24D 3/18* (2006.01)
*F25B 30/06* (2006.01)
*F28D 15/00* (2006.01)
*F28D 17/04* (2006.01)
*F24D 11/02* (2006.01)
*F24D 19/10* (2006.01)
*H02J 3/14* (2006.01)

(52) U.S. Cl.
CPC ..... *F24D 19/1015* (2013.01); *F24D 19/1039* (2013.01); *F25B 30/06* (2013.01); *F28D 15/00* (2013.01); *F28D 17/04* (2013.01); *F24D 2200/08* (2013.01); *F24D 2200/12* (2013.01); *F24D 2200/16* (2013.01); *F24D 2200/18* (2013.01); *F24D 2200/26* (2013.01); *F28D 2020/0078* (2013.01); *F28D 2020/0082* (2013.01); *H02J 3/14* (2013.01); *Y02B 10/70* (2013.01); *Y02B 30/126* (2013.01); *Y02B 30/52* (2013.01); *Y02E 20/14* (2013.01); *Y02P 80/15* (2015.11); *Y02P 80/152* (2015.11)

(58) Field of Classification Search
USPC .......................................................... 165/10
See application file for complete search history.

(56) References Cited

U.S. PATENT DOCUMENTS

| 2004/0216460 | A1* | 11/2004 | Ruggieri | ................ F01K 17/02 60/670 |
| 2008/0149309 | A1* | 6/2008 | Li | ........................ F28D 7/0016 165/104.19 |
| 2010/0257882 | A1* | 10/2010 | Penev | ................ F24D 17/0021 62/235.1 |
| 2011/0197599 | A1* | 8/2011 | Stewart | .................... F03G 7/04 62/56 |
| 2012/0255302 | A1* | 10/2012 | Hugelman | .............. F22B 1/167 60/651 |

FOREIGN PATENT DOCUMENTS

| CN | 202442385 | 9/2012 |
| CN | 103776079 | 5/2014 |

* cited by examiner

ELECTRIC POWER PEAK-SHAVING AND COMBINED HEAT AND POWER WASTE HEAT RECOVERY DEVICE AND OPERATION METHOD THEREOF

CROSS-REFERENCE TO RELATED APPLICATIONS

This patent application is a Continuation of international patent application PCT/CN2014/000187 filed Aug. 28, 2014, the disclosures of which are incorporated by reference in its entirety.

TECHNICAL FIELD

The present invention relates to a heat exchanging device and operating method thereof, and in particularly, to an electric peaking combined heat and power (CHP) waste heat recovery device and an operating method thereof by using heat storing technology in combination with combined heat and power (CHP) and waste heat recovery. The present invention belongs to the technical field of energy and power.

BACKGROUND

Northern China belongs to areas that are rich in wind energy, and the wind power generation is growing rapidly in these regions; in addition, the installed capacity of wind energy is increasing year by year, and the proportion of the installed capacity of wind energy in the total installed capacity is also increasing year by year. However, the wind power has an anti-load characteristic, i.e., during the electrical load trough in the power grid at night, the wind power output is large, and during the electrical load peak in the power grid at daytime, the wind power output is small. Meanwhile, the difference between electrical load peak and electrical load trough is also expanding year by year, thus it is difficult to regulate the peak load.

Currently, the cities and towns in Northern China are still dependent on coal-fired boiler technology, which supplies the heat with high energy consumption and high pollution. Combined heat and power (CHP) is an efficient heating supply mode. However, the heat power plants in China operate in the way of 'heat determines electricity'. In order to ensure heat supply, regulation ranges of the power output for many heat power plants are greatly limited, and the energy production cannot be reduced during the electrical load trough, thereby occupying the room of the wind generated electricity in the electrical grid, thus the wind power station has to limit its power output, which leads to phenomena of "fan suspending" in the areas that are rich in wind energy in Northern China.

Applying heat pump technology to recover exhaust waste heat of the combined heat and power (CHP) unit may further improve the heat supply efficiency of the combined heat and power (CHP), but it still cannot change the operating mode of 'heat determines electricity'. The combined heat and power (CHP) may operate in the mode of 'electricity determines heat' by combining heat storage and the combined heat and power (CHP) unit through the heat storage stabilizing fluctuation of heat output, however, when in combination with the exhaust waste heat recovery technology in power plants, it still cannot ensure the stable recovery for the exhaust waste heat of the power plant.

SUMMARY

To solve the above problems, an object of the invention is to provide an electric peaking combined heat and power (CHP) waste heat recovery device and an operating method thereof by using heat storing technology in combination with combined heat and power (CHP) and waste heat recovery, so as to realize electric peaking combined heat and power (CHP) unit on the basis of realization of waste heat recovery.

In order to realize the above object, the invention adopts the following technical solution: an electric peaking combined heat and power (CHP) waste heat recovery device, characterized in that, the device comprises an inner power plant portion and a heat exchange station portion, wherein the inner power plant portion mainly comprises a heat exchanger (1), a waste heat recovery electric heat pump (2), an energy-storing electric heat pump (3), a high temperature water storing tank (4), a low temperature water storing tank (5), a heating network heater (6), valves (11-19) and circulating water pumps (20-23); wherein an inlet of the heat exchanger (1) is connected to a primary network backwater pipe (1-1), and an outlet of the heat exchanger (1) is connected to inlets of the valve (11), the valve (12) and the circulating water pump (20) in parallel, respectively; an inlet of the waste heat recovery electric heat pump (2) is connected to an outlet of the valve (12), and an outlet of the waste heat recovery electric heat pump (2) is connected to an inlet of the heating network heater (6); a top inlet/outlet of the high temperature water storing tank (4) is connected to an outlet of the valve (13) and an inlet of the valve (14) in parallel, respectively, an inlet of the valve (13) is connected to an outlet of a condenser of the energy-storing electric heat pump (3) and an outlet of the valve (14) is connected to the inlet of the heating network heater (6); a bottom inlet/outlet of the high temperature water storing tank is connected to an outlet of the valve (15) and an inlet of the circulating water pump (21) in parallel, respectively, an inlet of the valve (15) is connected to an outlet of the circulating water pump (20), and an outlet of the circulating water pump (21) is connected to an inlet of the condenser of the energy-storing electric heat pump (3) via the valve (16); a top inlet/outlet of the low temperature water storing tank (5) is connected to an outlet of the valve (11) and an inlet of the valve (17) in parallel, respectively, and an outlet of the valve (17) is connected to an inlet of an evaporator of the energy-storing electric heat pump (3); a bottom inlet/outlet of the low temperature water storing tank (5) is connected to an outlet of the valve (18) and an inlet of the circulating water pump (22) in parallel, respectively, an inlet of the valve (18) is connected to an outlet of the evaporator of the energy-storing electric heat pump (3) via the circulating water pump (23), and an outlet of the circulating water pump (22) is connected to the inlet of the heat exchanger (1) in parallel via the valve (19);

wherein the heat exchange station portion mainly comprises a high temperature water storing tank (7), a low temperature water storing tank (8), an electric heat pump (9), a heat exchanger (10), valves (24-35) and a circulating water pump (36-37); wherein a top inlet/outlet of the high temperature water storing tank (7) is connected to an outlet of a valve (24) and an inlet of the circulating water pump (36) in parallel, respectively, an inlet of the valve (24) is connected to an outlet of the heating network heater (6) via a primary network water supply pipe (1-2), an outlet of the circulating water pump (36) connected to the primary network water supply pipe (1-2) in parallel via the valve (25) is connected to an inlet of the valve (26), and an outlet of the valve (26) is connected to an inlet of a primary network of the heat exchanger (10); a bottom inlet/outlet of the high temperature water storing tank (7) is connected to an outlet of the valve (27) and an inlet of the valve (28) in parallel, respectively, an inlet of the valve (27) is connected to an outlet of the primary network of the heat exchanger (10), and an outlet of the valve (28) is connected to an inlet of an evaporator of the electric heat pump (9); a top inlet/outlet of the low temperature water storing tank (8) is also connected to the outlet of the valve (27) and the inlet of the valve (28) in parallel, respectively, a bottom inlet/outlet of the low temperature water storing tank (8) is connected to an outlet of the valve (29) and an inlet of the valve (30) in parallel, respectively, and an outlet of the valve (30) is connected to the primary network backwater pipe (1-1); an outlet of the evaporator of the electric heat pump (9) is connected to an inlet of the circulating water pump (37) and the primary network backwater pipe (1-1) in parallel via the valve (31), respectively, and an outlet of the circulating water pump (37) is connected to an inlet of the valve (29); a secondary network backwater pipe (1-3) is connected to inlets of the valve (32) and the valve (33) in parallel, respectively, an outlet of the valve (32) is connected to an inlet of the secondary network of the heat exchanger (10), both outlets of the valve (33) and the secondary network of the heat exchanger (10) are connected to inlets of the valve (34) and the valve (35) in parallel, respectively, an outlet of the valve (35) is connected to a secondary network water supply pipe (1-4), an outlet of the valve (34) is connected to an inlet of a condenser of the electric heat pump (9), and an outlet of the condenser of the electric heat pump (9) is connected to the secondary network water supply pipe (1-4).

In a preferred embodiment, the heat exchanger (1) adopts a condenser or a water-water heat exchanger.

In a preferred embodiment, the heat exchanger (10) adopts a plate-type heat exchanger or an absorption-type heat exchanger unit.

An operating method for the electric peaking combined heat and power (CHP) waste heat recovery device described above, characterized in that, the operating method adjusts operating modes of the device through combination of different valve switches such that the device can operate in periods of an electrical load trough, an electrical load flat and an electrical load peak respectively:

1) during electrical load trough period: in the inner power plant portion, the valve (11), the valve (14), the valve (15), the valve (19), the circulating water pump (20) and the circulating water pump (22) are closed; the valve (12), the valve (13), the valve (16), the valve (17), the valve (18), the circulating water pump (21) and the circulating water pump (23) are open; primary network low temperature backwater provided by the primary network backwater pipe (1-1) flows into the heat exchanger (1) and the waste heat recovery electric heat pump (2) successively; the heat exchanger (1) and the waste heat recovery electric heat pump (2) recover exhaust waste heat of the combined heat and power (CHP) unit to heat the primary network low temperature backwater; the heated heating network water from the waste heat recovery electric heat pump (4) flows into the heating network heater (6), wherein the heated heating network water is steam extracted and heated by the combined heat and power (CHP) unit to a heating network design temperature to obtain primary network high temperature supply water flowing into the primary network water supply pipe (1-2) which supplies the primary network high temperature supply water; meanwhile, water stored in the high temperature water storing tank (4) is drawn from the bottom outlet via the circulating water pump (21) and flows into the condenser of the energy-storing electric heat pump (3); and after heat exchanged and heated, the water flows back into the high temperature water storing tank (4) from the top inlet; water stored in the low temperature water storing tank (5) is pressed from the top outlet and flows into the evaporator of the energy-storing electric heat pump (3), and after heat exchanged and cooled, the water is directed into the low temperature water storing tank (5) from the bottom inlet via the circulating water pump (23);

In the heat exchange station portion, the valve (25), the valve (26), the valve (27), the valve (30), the valve (32), the valve (35) and the circulating water pump (36) are closed; the other valves and the circulating water pump (37) are open; primary network high temperature supply water provided by the primary network water supply pipe (1-2) flows into the high temperature water storing tank (7) from the top inlet; the high temperature supply water is stored in the high temperature water storing tank (7), thus pressing middle temperature water stored in the high temperature water storing tank (7) from the bottom outlet and is mixed with middle temperature stored water pressed from the top outlet of the low temperature water storing tank (8); then the mixed water flows into the evaporator of the electric heat pump (9); after heat exchanged and cooled, the mixed water is divided into two branches, one of which is directed into the low temperature water storing tank (8) from the bottom inlet via the circulating water pump (37), and the other of which flows into the primary network backwater pipe (1-1); meanwhile, secondary network low temperature backwater provided by the secondary network water supply pipe (1-3) flows through the condenser of the electric heat pump (9); and after heat exchanging and heating the secondary network low temperature backwater, secondary network high temperature supply water is obtained, which flows into the secondary network water supply pipe (1-4) for supplying to heat users;

2) during electrical load flat period: in the inner power plant portion, the valve (16), the valve (18), the circulating water pump (21) and the circulating water pump (23) are closed; the energy-storing electric heat pump (3) is shut down; and the other parts operates in the same way as that during the electrical load trough period;

In the heat exchange station portion, the valve (24), the valve (25), the valve (29), the valve (30), the valve (33), the valve (35) and the circulating water pump (37) are closed; the other valves and the circulating water pump (36) are open; primary network high temperature supply water provided by the primary network water supply pipe (1-2) flows through a primary network side of the heat exchanger (10) and the evaporator of the electric heat pump (9) successively; after heat exchanging and cooling the primary network high temperature supply water, primary network low temperature backwater is obtained, which flows into the primary network backwater pipe (1-1); meanwhile, secondary network low temperature backwater provided by the secondary network backwater pipe (1-3) flows through a secondary network side of the heat exchanger (10) and the condenser of the electric heat pump (9) successively; and after heat exchanging and heating the secondary network low temperature backwater, secondary network high temperature supply water is obtained, which flows into the secondary network water supply pipe (1-4) for supplying to the heat users;

3) during electrical load peak period: in the inner power plant portion, the valve (12), the valve (13), the valve (16), the valve (17), the valve (18), the circulating water pump (21) and the circulating water pump (23) are closed; the valve (11), the valve (14), the valve (15), the valve (19), the circulating water pump (20) and the circulating water pump (22) are open; low temperature water stored in the low temperature water storing tank (5) is drawn from the bottom outlet and is mixed with the primary network low temperature backwater, and then the low temperature mixed water is sent to heat exchanger (1); the heat exchanger (1) recovers the exhaust waste heat of the combined heat and power (CHP) unit to heat the low temperature mixed water; the heated heating network water by the heat exchanger (1) is divided into two branches, one of which returns back into the low temperature water storing tank (5) from the top inlet, the other of which is directed into the high temperature water storing tank (4) from the bottom inlet via the circulating water pump (20); and high temperature water stored in the high temperature water storing tank (4) is pressed from the top outlet and then is sent to the heating network heater (6); wherein the high temperature water is steam extracted and heated by the combined heat and power (CHP) unit to a heating network design temperature to obtain the primary network high temperature supply water flowing into the primary network water supply pipe (1-2) which supplies the primary network high temperature supply water;

In the heat exchange station portion, the valve (24), the valve (28), the valve (29), the valve (31), the valve (33), the valve (34) and the circulating water pump (37) are closed; the electric heat pump (9) is shut down; the other valves and the circulating water pump (36) are open; high temperature water stored in the high temperature water storing tank (7) is drawn from the top outlet by the circulating water pump (36) and is mixed with the primary network high temperature supply water provided by the primary network water supply pipe (1-2); and then the mixed water flows through the primary network side of the heat exchanger (10); after heat exchanging and cooling the mixed water, middle temperature water is obtained and divided into two branches, one of which flows into the high temperature water storing tank (7) from the bottom inlet, the other of which flows into the low temperature water storing tank (8) from the top inlet, thus pressing low temperature water stored in the low temperature water storing tank (8) from the bottom outlet; the pressed low temperature water flows into the primary network backwater pipe (1-1); meanwhile, the secondary low temperature backwater provided by the secondary network backwater pipe (1-3) flows through the secondary network side of the heat exchanger (10); and after heat exchanging and heating the secondary low temperature backwater, secondary network high temperature supply water is obtained, which flows into the secondary network water supply pipe (1-4) for supplying to the heat users.

An electric peaking combined heat and power (CHP) waste heat recovery device, characterized in that, the device comprises an inner power plant portion and a heat exchange station portion, wherein the inner power plant portion mainly comprises a heat exchanger (1), a waste heat recovery electric heat pump (2), an energy-storing electric heat pump (3), a high temperature water storing tank (4), a low temperature water storing tank (5), a heating network heater (6), valves (11-19) and circulating water pumps (20-23); wherein an inlet of the heat exchanger (1) is connected to a primary network backwater pipe (1-1), and an outlet of the heat exchanger (1) is connected to inlets of the valve (11), the valve (12) and the circulating water pump (20) in parallel, respectively; an inlet of the waste heat recovery electric heat pump (2) is connected to an outlet of the valve (12), and an outlet of the waste heat recovery electric heat pump (2) is connected to an inlet of the heating network heater (6); a top inlet/outlet of the high temperature water storing tank (4) is connected to an outlet of the valve (13) and an inlet of the valve (14) in parallel, respectively, an inlet of the valve (13) is connected to an outlet of a condenser of the energy-storing electric heat pump (3) and an outlet of the valve (14) is connected to the inlet of the heating network heater (6); a bottom inlet/outlet of the high temperature water storing tank is connected to an outlet of the valve (15) and an inlet of the circulating water pump (21) in parallel, respectively, an inlet of the valve (15) is connected to an outlet of the circulating water pump (20), and an outlet of the circulating water pump (21) is connected to an inlet of the condenser of the energy-storing electric heat pump (3) via the valve (16); a top inlet/outlet of the low temperature water storing tank (5) is connected to an outlet of the valve (11) and an inlet of the valve (17) in parallel, respectively, and an outlet of the valve (17) is connected to an inlet of an evaporator of the energy-storing electric heat pump (3); a bottom inlet/outlet of the low temperature water storing tank (5) is connected to an outlet of the valve (18) and an inlet of the circulating water pump (22) in parallel, respectively, an inlet of the valve (18) is connected to an outlet of the evaporator of the energy-storing electric heat pump (3) via the circulating water pump (23), and an outlet of the circulating water pump (22) is connected to the inlet of the heat exchanger (1) in parallel via the valve (19);

wherein the heat exchange station portion mainly comprises a low temperature water storing tank (8), an electric heat pump (9), a heat exchanger (10), valves (26-35) and a circulating water pump (37); wherein an inlet of the valve (26) is connected to an outlet of the heating network heater (6) via a primary network water supply pipe (1-2); an outlet of the valve (26) is connected to an inlet of a primary network of the heat exchanger (10); a top inlet/outlet of the low temperature water storing tank (8) is connected to an outlet of the valve (27) and an inlet of the valve (28) in parallel, respectively; an inlet of the valve (27) is connected to an outlet of the primary network of the heat exchanger (10), and an outlet of the valve (28) is connected to an inlet of an evaporator of the electric heat pump (9); a bottom inlet/outlet of the low temperature water storing tank (8) is connected to an outlet of the valve (29) and an inlet of the valve (30) in parallel, respectively, and an outlet of the valve (30) is connected to the primary network backwater pipe (1-1); an outlet of the evaporator of the electric heat pump (9) is connected to an inlet of the circulating water pump (37) and the primary network backwater pipe (1-1) in parallel via the valve (31), respectively, and an outlet of the circulating water pump (37) is connected to an inlet of the valve (29); a secondary network backwater pipe (1-3) is connected to inlets of the valve (32) and the valve (33) in parallel, respectively, an outlet of the valve (32) is connected to an inlet of a secondary network of the heat exchanger (10), both outlets of the valve (33) and the secondary network of the heat exchanger (10) are connected to inlets of the valve (34) and the valve (35) in parallel, respectively, an outlet of the valve (35) is connected to a secondary network water supply pipe (1-4), an outlet of the valve (34) is connected to an inlet of a condenser of the electric heat pump (9), and an outlet of the condenser of the electric heat pump (9) is connected to the secondary network water supply pipe (1-4).

In a preferred embodiment, the heat exchanger (1) adopts a condenser or a water-water heat exchanger.

In a preferred embodiment, the heat exchanger (10) adopts a plate-type heat exchanger or an absorption-type heat exchanger unit.

An operating method for the electric peaking combined heat and power (CHP) waste heat recovery device described above, characterized in that, the operating method adjusts operating modes of the device through combination of different valve switches such that the device can operate in periods of an electrical load trough, an electrical load flat and an electrical load peak respectively:

1) during electrical load trough period: in the inner power plant portion, the valve (11), the valve (14), the valve (15), the valve (19), the circulating water pump (20) and the circulating water pump (22) are closed; the valve (12), the valve (13), the valve (16), the valve (17), the valve (18), the circulating water pump (21) and the circulating water pump (23) are open; primary network low temperature backwater provided by the primary network backwater pipe (1-1) flows into the heat exchanger (1) and the waste heat recovery electric heat pump (2) successively; the heat exchanger (1) and the waste heat recovery electric heat pump (2) recover exhaust waste heat of the combined heat and power (CHP) unit to heat the primary network low temperature backwater; the heated heating network water from the waste heat recovery electric heat pump (4) flows into the heating network heater (6), wherein the heated heating network water is steam extracted and heated by the combined heat and power (CHP) unit to a heating network design temperature to obtain primary network high temperature supply water flowing into the primary network water supply pipe (1-2) which supplies the primary network high temperature supply water; meanwhile, water stored in the high temperature water storing tank (4) is drawn from the bottom outlet via the circulating water pump (21) and flows into the condenser of the energy-storing electric heat pump (3); and after heat exchanged and heated, the water flows back into the high temperature water storing tank (4) from the top inlet; water stored in the low temperature water storing tank (5) is pressed from the top outlet and flows into the evaporator of the energy-storing electric heat pump (3), and after heat exchanged and cooled, the water is directed into the low temperature water storing tank (5) from the bottom inlet via the circulating water pump (23);

In the heat exchange station portion, the valve (30), the valve (33), the valve (35) are closed; the other valves and the circulating water pump (37) are open; primary network high temperature supply water provided by the primary network water supply pipe (1-2) first flows through a primary network side of the heat exchanger (10); and after heat exchanged and cooled, the primary network high temperature supply water is mixed with middle temperature stored water pressed from the top outlet of the low temperature water storing tank (8), then the mixed water flows through the evaporator of the electric heat pump (9); after further heat exchanged and cooled, the mixed water is divided into two branches, one of which is directed into the low temperature water storing tank (8) from the bottom inlet by the circulating water pump (37), the other of which flows into the primary network backwater pipe (1-1); meanwhile, secondary network low temperature backwater provided by the secondary network water supply pipe (1-3) first flows through a secondary network side of the heat exchanger (10); after heat exchanged and heated, the secondary network low temperature backwater flows into the condenser of the electric heat pump (9); after further heat exchanging and heating the secondary network low temperature backwater, secondary network high temperature supply water is obtained, which flows into the secondary network water supply pipe (1-4) for supplying to heat users;

2) during electrical load flat period: in the inner power plant portion, the valve (16), the valve (18), the circulating water pump (21) and the circulating water pump (23) are closed; the energy-storing electric heat pump (3) is shut down, and the other parts operate in the same way as that during the electrical load trough period;

In the heat exchange station portion, the valve (29), the valve (30), the valve (33), the valve (35) and the circulating water pump (37) are closed; the other valves are open; primary network high temperature supply water provided by the primary network water supply pipe (1-2) flows through the primary network side of the heat exchanger (10) and the evaporator of the electric heat pump (9) successively, after heat exchanging and cooling the primary network high temperature supply water, the primary network low temperature backwater is obtained, which flows into the primary network backwater pipe (1-1); meanwhile, secondary network low temperature backwater provided by the secondary network backwater pipe (1-3) flows through a secondary network side of the heat exchanger (10) and the condenser of the electric heat pump (9) successively; and after heat exchanging and heating the secondary network low temperature backwater, secondary network high temperature supply water is obtained, which flows into the secondary network water supply pipe (1-4) for supplying to the heat users;

3) during electrical load peak period: in the inner power plant portion, the valve (12), the valve (13), the valve (16), the valve (17), the valve (18), the circulating water pump (21) and the circulating water pump (23) are closed; the valve (11), the valve (14), the valve (15), the valve (19), the circulating water pump (20) and the circulating water pump (22) are open; low temperature water stored in the low temperature water storing tank (5) is drawn from the bottom outlet and is mixed with the primary network low temperature backwater, and then the low temperature mixed water is sent to heat exchanger (1); the heat exchanger (1) recovers the exhaust waste heat of the combined heat and power (CHP) unit to heat the low temperature mixed water; the heated heating network water by the heat exchanger (1) is divided into two branches, one of which returns back into the low temperature water storing tank (5) from the top inlet, the other of which is directed into the high temperature water storing tank (4) from the bottom inlet via the circulating water pump (20); and high temperature water stored in the high temperature water storing tank (4) is pressed from the top outlet and then is sent to the heating network heater (6); wherein the high temperature water is steam extracted and heated by the combined heat and power (CHP) unit to a heating network design temperature to obtain the primary network high temperature supply water flowing into the primary network water supply pipe (1-2) which supplies the primary network high temperature supply water;

In the heat exchange station portion, the valve (28), the valve (29), the valve (31), the valve (33), the valve (34) and the circulating water pump (37) are closed; the electric heat pump (9) is shut down; the other valves are open; the primary network high temperature supply water provided by the primary network water supply pipe (1-2) flows through the primary network side of the heat exchanger (10), and flows into the low temperature water storing tank (8) after heat exchanged and cooled; the low temperature water stored in the low temperature water storing tank (8) is pressed from the bottom outlet and is sent to the primary network backwater pipe (1-1); meanwhile, the secondary network low temperature backwater provided by the secondary network backwater pipe (1-3) flows through the secondary network side of the heat exchanger (10), and after heat exchanging and heating the secondary network low temperature backwater, the secondary network high temperature supply water is obtained, which flows into the secondary network water supply pipe (1-4) for supplying to the heat users.

By applying the above technical solutions, the invention has the following advantages: 1. the waste heat recovery device of the invention comprises an inner power plant portion and a heat exchange station portion, wherein the inner power plant portion comprises a energy-storing and releasing system including an energy-storing electric heat pump, a high temperature water storing tank, a low temperature water storing tank, valves and circulating water pumps. During periods of the electrical load trough, the electrical load flat and the electrical load peak, the device adjusts the power output of the inner power plant portion and the electrical load of the heat exchanger station portion by intermittently operating the electric heat pumps in the inner power plant portion and the heat exchange station portion. The high temperature water storing tank is used for balancing the difference between system heat supply amount and heating load, the low temperature water storing tank is used for stabilizing steam exhaust waste heat recovery amount, thereby, thereby significantly improving the electric peaking capacity, and the problem that the electricity generation peaking capacity is limited due to mutual coupling of electricity generation and heat supply in traditional operating modes of 'heat determines electricity' in the CHP is solved, a CHP unit can adjust the grid power generation thereof and participate in power grid load regulation, the power grid regulating capacity can be improved so as to deal with the condition of constantly increasing of electrical load trough-to-peak difference, and the absorptive capacity of a power grid for wind power generation can be improved so as to reduce phenomena of 'fan suspending'. 2. The waste heat recovering device of the invention may partially or fully recover the exhaust waste heat of the combined heat and power (CHP) unit, significantly improving the heat supply capacity of heat and power plant and the energy utilization efficiency of the system. 3. The invention also realizes "large temperature difference" heat supply of a primary network, which significantly expands the temperature differences between the supply water and backwater, improves the heat supply capacity of the existing pipe network by 50% without changing the primary network traffic; meanwhile, the present invention also realizes long-distance transportation.

BRIEF DESCRIPTION OF THE DRAWINGS

The invention will be described in details in the following with reference to drawings. However, it should be appreciated that the drawings are provided only for better understanding the invention, not to be interpreted to limit the invention.

DETAILED DESCRIPTION

The invention will be described in the following in details with reference to drawings and embodiments.

Figure 1:
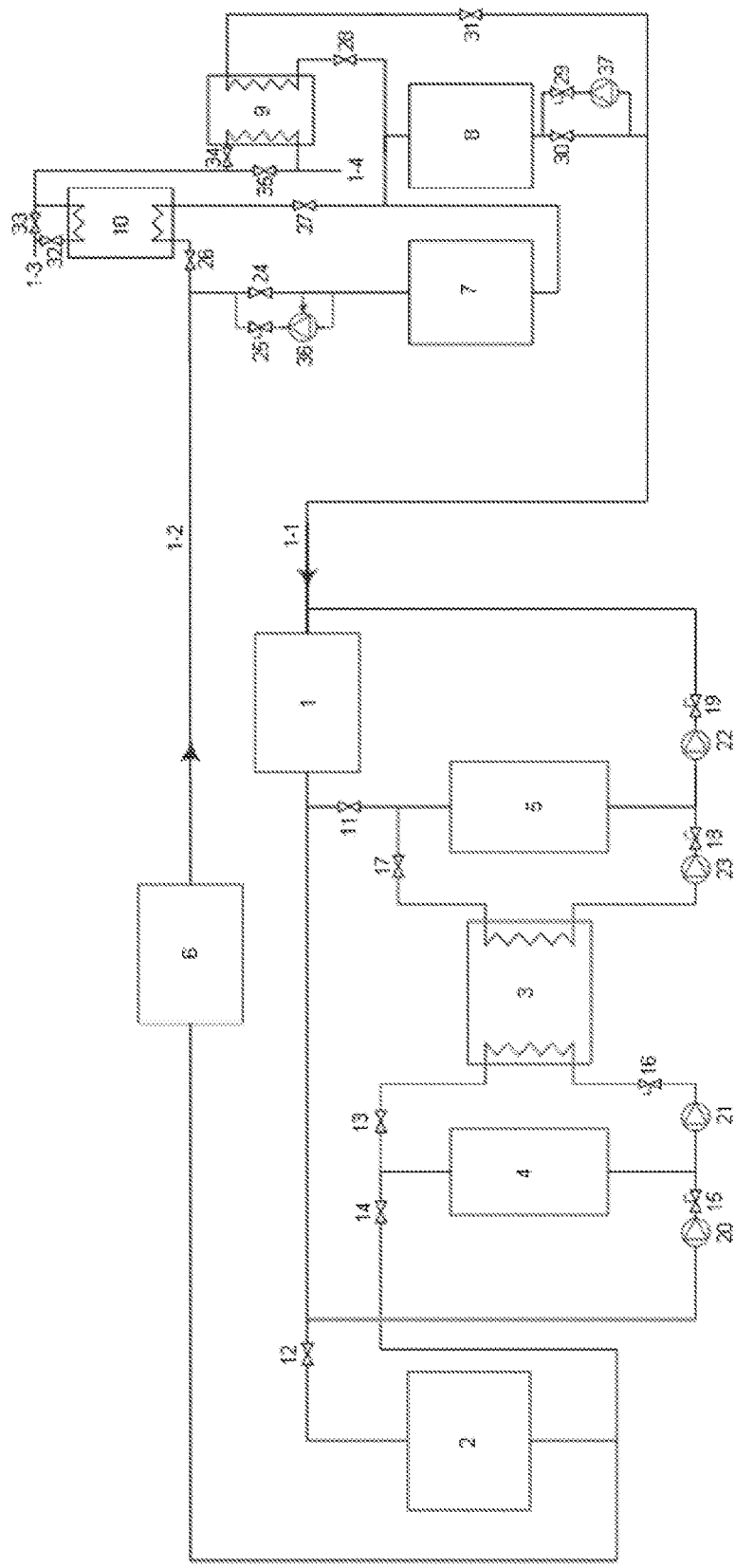
FIG. 1 is an overall structural schematic of a waste recovering device of the invention.

As shown in FIG. 1, the device of the invention comprises an inner power plant portion and a heat exchange station portion.

The inner power plant portion mainly comprises a condenser/water-water heat exchanger 1, a waste heat recovery electric heat pump 2, an energy-storing electric heat pump 3, a high temperature water storing tank 4, a low temperature water storing tank 5, a heating network heater 6, valves 11-19 and circulating water pumps 20-23; wherein the inlet of the condenser/water-water heat exchanger 1 is connected to the primary network backwater pipe 1-1, and the outlet of the condenser/water-water heat exchanger 1 is connected to the inlets of the valve 11, the valve 12 and the circulating water pump 20 in parallel, respectively. The inlet of the waste heat recovery electric heat pump 2 is connected to the outlet of the valve 12, and the outlet of the waste heat recovery electric heat pump 2 is connected to the inlet of the heating network heater 6. The top inlet/outlet of the high temperature water storing tank 4 is connected to the outlet of the valve 13 and the inlet of the valve 14 in parallel, respectively, the inlet of the valve 13 is connected to the outlet of a condenser of the energy-storing electric heat pump 3 and the outlet of the valve 14 is connected to the inlet of the heating network heater 6. The bottom inlet/outlet of the high temperature water storing tank 4 is connected to the outlet of the valve 15 and the inlet of the circulating water pump 21 in parallel, respectively, the inlet of the valve 15 is connected to the outlet of the circulating water pump 20, and the outlet of the circulating water pump 21 is connected to inlet of a condenser of the energy-storing electric heat pump 3 via the valve 16. The top inlet/outlet of the low temperature water storing tank 5 is connected to the outlet of the valve 11 and the inlet of the valve 17 in parallel, respectively, and the outlet of the valve 17 is connected to the inlet of an evaporator of the energy-storing electric heat pump 3. The bottom inlet/outlet of the low temperature water storing tank 5 is connected to the outlet of the valve 18 and the inlet of the circulating water pump 22 in parallel, respectively, the inlet of the valve 18 is connected to the outlet of the evaporator of the energy-storing electric heat pump 3 via the circulating water pump 23, and the outlet of the circulating water pump 22 is connected to the inlet of the condenser/water-water heat exchanger 1 in parallel via the valve 19.

The heat exchange station portion mainly comprises a high temperature water storing tank 7, a low temperature water storing tank 8, an electric heat pump 9, a plate-type heat exchanger 10, valves 24-35 and circulating water pumps 36-37; wherein the top inlet/outlet of the high temperature water storing tank 7 is connected to the outlet of the valve 24 and the inlet of the circulating water pump 36 in parallel, respectively, the inlet of the valve 24 is connected to the outlet of the heating network heater 6 via a primary network water supply pipe 1-2, the outlet of the circulating water pump 36 connected to the primary network water supply pipe 1-2 in parallel via the valve 25 is connected to the inlet of the valve 26, the outlet of the valve 26 is connected to the inlet of a primary network of the plate-type heat exchanger 10. The bottom inlet/outlet of the high temperature water storing tank 7 is connected to the outlet of the valve 27 and the inlet of the valve 28 in parallel, respectively, the inlet of the valve 27 is connected to the outlet of a primary network of the plate-type heat exchanger 10, and the outlet of the valve 28 is connected to the inlet of the evaporator of the electric heat pump 9. The top inlet/outlet of the low temperature water storing tank 8 is also connected to the outlet of the valve 27 and the inlet of the valve 28 in parallel, respectively, the bottom inlet/outlet of the low temperature water storing tank 8 is connected to the outlet of the valve 29 and the inlet of the valve 30 in parallel, respectively, the outlet of the valve 30 is connected to the primary network backwater pipe 1-1. The outlet of the evaporator of the electric heat pump 9 is connected to the inlet of the circulating water pump 37 and the primary network backwater pipe 1-1 in parallel via the valve 31, respectively, and the outlet of the circulating water pump 37 is connected to inlet of the valve 29. The secondary network backwater pipe 1-3 is connected to the inlets of the valve 32 and the valve 33, respectively, the outlet of the valve 32 is connected to the inlet of the secondary network of the plate-type heat exchanger 10, both the outlet of the valve 33 and the outlet of the secondary network of the plate-type heat exchanger 10 are connected to the inlets of the valve 34 and the valve 35 in parallel, respectively, the outlet of the valve 35 is connected to the secondary network water supply pipe 1-4, the outlet of the valve 34 is connected to the inlet of the condenser of the electric heat pump 9, and the outlet of the condenser of the electric heat pump 9 is connected to the secondary network water supply pipe 1-4.

In a preferred embodiment, in the heat exchange station portion, the plate-type heat exchanger 10 may be replaced by absorption-type heat exchanger unit to reduce the water inlet temperature for the evaporator of the electric heat pump 9 such that the power consumption of the electric heat pump 9 is reduced.

Based on the electric peaking combined heat and power (CHP) waste heat recovery device provided in the above embodiment, the invention also provides a method for electric peaking combined heat and power (CHP) waste heat recovery, the method adjusts operating modes of the device through combination of different valve switches such that the device can operate in periods of an electrical load trough, an electrical load flat and an electrical load peak respectively:

1. during electrical load trough period: in the inner power plant portion, the valve 11, the valve 14, the valve 15, the valve 19, the circulating water pump 20 and the circulating water pump 22 are closed; the valve 12, the valve 13, the valve 16, the valve 17, the valve 18, the circulating water pump 21 and the circulating water pump 23 are open; primary network low temperature backwater provided by the primary network backwater pipe 1-1 flows into the condenser/water-water heat exchanger 1 and the waste heat recovery electric heat pump 2 successively; the condenser/water-water heat exchanger 1 and the waste heat recovery electric heat pump 2 recover exhaust waste heat of the combined heat and power unit to heat the primary network low temperature backwater; the heated heating network water from the waste heat recovery electric heat pump 4 flows into the heating network heater 6, wherein the heated heating network water is steam extracted and heated by the combined heat and power unit to a heating network design temperature to obtain primary network high temperature supply water flowing into the primary network water supply pipe 1-2 which supplies the primary network high temperature supply water; meanwhile, water stored in the high temperature water storing tank 4 is drawn from the bottom outlet via the circulating water pump 21 and flows into the condenser of the energy-storing electric heat pump 3; and after heat exchanged and heated, the water flows back into the high temperature water storing tank 4 from the top inlet; water stored in the low temperature water storing tank 5 is pressed from the top outlet and flows into the evaporator of the energy-storing electric heat pump 3, and after heat exchanged and cooled, the water is directed into the low temperature water storing tank 5 from the bottom inlet via the circulating water pump 23.

In the heat exchange station portion, the valve 25, the valve 26, the valve 27, the valve 30, the valve 32, the valve 35 and the circulating water pump 36 are closed; the other valves and the circulating water pump 37 are open; primary network high temperature supply water provided by the primary network water supply pipe 1-2 flows into the high temperature water storing tank 7 from the top inlet; the high temperature supply water is stored in the high temperature water storing tank 7, thus pressing middle temperature water stored in the high temperature water storing tank 7 from the bottom outlet and is mixed with middle temperature stored water pressed from the top outlet of the low temperature water storing tank 8; then the mixed water flows into the evaporator of the electric heat pump 9; after heat exchanged and cooled, the mixed water is divided into two branches, one of which is directed into the low temperature water storing tank 8 from the bottom inlet via the circulating water pump 37, and the other of which flows into the primary network backwater pipe 1-1; meanwhile, secondary network low temperature backwater provided by the secondary network water supply pipe 1-3 flows through the condenser of the electric heat pump 9; and after heat exchanging and heating the secondary network low temperature backwater with middle temperature water stored from the high temperature water storing tank 7 and the low temperature water storing tank 8, secondary network high temperature supply water is obtained, which flows into the secondary network water supply pipe 1-4 for supplying to heat users.

2 during electrical load flat period: in the inner power plant portion, the valve 16, the valve 18, the circulating water pump 21 and the circulating water pump 23 are closed; the energy-storing electric heat pump 3 is shut down; and the other parts operates in the same way as that during the electrical load trough period;

In the heat exchange station portion, the valve 24, the valve 25, the valve 29, the valve 30, the valve 33, the valve 35 and the circulating water pump 37 are closed; the other valves and the circulating water pump 36 are open; primary network high temperature supply water provided by the primary network water supply pipe 1-2 flows through a primary network side of the heat exchanger 10 and the evaporator of the electric heat pump 9 successively; after heat exchanging and cooling the primary network high temperature supply water, primary network low temperature backwater is obtained, which flows into the primary network backwater pipe 1-1; secondary network low temperature backwater provided by the secondary network backwater pipe 1-3 flows through a secondary network side of the heat exchanger 10 and the condenser of the electric heat pump 9 successively; and after heat exchanging and heating the secondary network low temperature backwater with the primary network high temperature supply water, secondary network high temperature supply water is obtained, which flows into the secondary network water supply pipe 1-4 for supplying to the heat users, wherein the boot capacity of the electric heat pump 9 is less than that of the electric heat pump 9 during the electrical load trough period.

3 during electrical load peak period: in the inner power plant portion, the valve 12, the valve 13, the valve 16, the valve 17, the valve 18, the circulating water pump 21 and the circulating water pump 23 are closed; the valve 11, the valve 14, the valve 15, the valve 19, the circulating water pump 20 and the circulating water pump 22 are open; low temperature water stored in the low temperature water storing tank 5 is drawn from the bottom outlet and is mixed with the primary network low temperature backwater, and then the low temperature mixed water is sent to the condenser/water-water heat exchanger 1; the condenser/water-water heat exchanger 1 recovers the exhaust waste heat of the combined heat and power unit to heat the low temperature mixed water, wherein the amount of exhaust waste heat recovered by the condenser/water-water heat exchanger 1 is larger than that of the exhaust waste heat recovered by the condenser/water-water heat exchanger 1 during the electrical load trough period; the heated heating network water by the condenser/water-water heat exchanger 1 is divided into two branches, one of which returns back into the low temperature water storing tank 5 from the top inlet, the other of which is directed into the high temperature water storing tank 4 from the bottom inlet via the circulating water pump 20; and high temperature water stored in the high temperature water storing tank 4 is pressed from the top outlet and then is sent to the heating network heater 6; wherein the high temperature water is steam extracted and heated by the combined heat and power unit to a heating network design temperature to obtain the primary network high temperature supply water flowing into the primary network water supply pipe 1-2 which supplies the primary network high temperature supply water;

In the heat exchange station portion, the valve 24, the valve 28, the valve 29, the valve 31, the valve 33, the valve 34 and the circulating water pump 37 are closed; the electric heat pump 9 is shut down; the other valves and the circulating water pump 36 are open; high temperature water stored in the high temperature water storing tank 7 is drawn from the top outlet by the circulating water pump 36 and is mixed with the primary network high temperature supply water provided by the primary network water supply pipe 1-2; and then the mixed water flows through the primary network side of the heat exchanger 10; after heat exchanging and cooling the mixed water, middle temperature water is obtained and divided into two branches, one of which flows into the high temperature water storing tank 7 from the bottom inlet, the other of which flows into the low temperature water storing tank 8 from the top inlet, thus pressing low temperature water stored in the low temperature water storing tank 8 from the bottom outlet; the pressed low temperature water flows into the primary network backwater pipe 1-1; the secondary low temperature backwater provided by the secondary network backwater pipe 1-3 flows through the secondary network side of the heat exchanger 10; and after heat exchanging and heating the secondary low temperature backwater, secondary network high temperature supply water is obtained, which flows into the secondary network water supply pipe 1-4 for supplying to the heat users.

Figure 2:
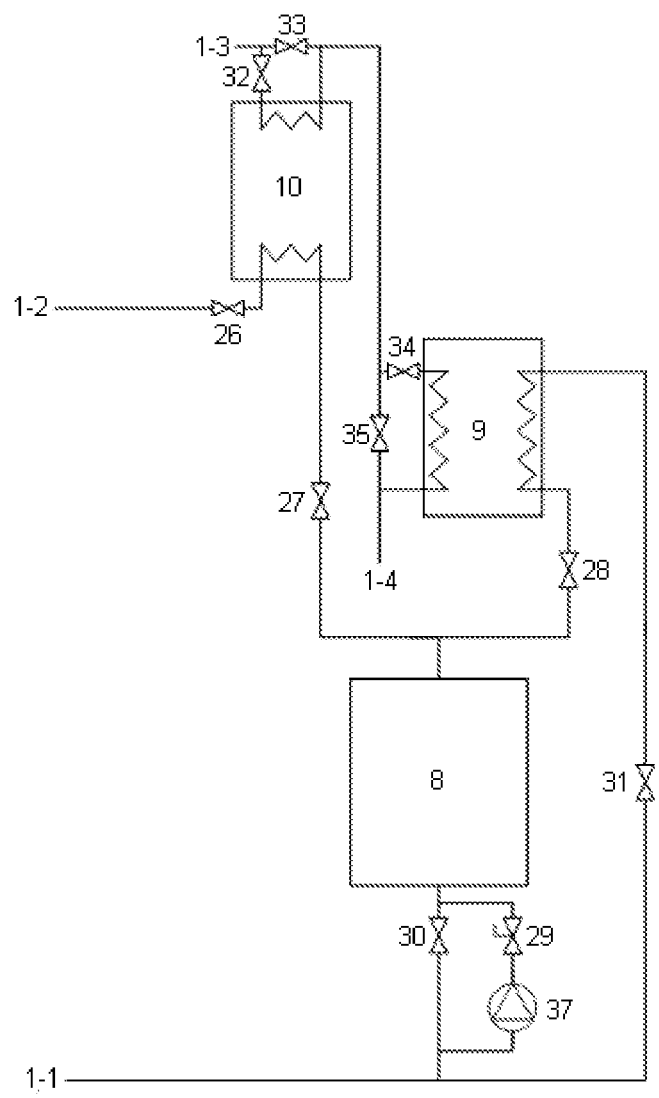
FIG. 2 is a structural schematic of another heat exchanger of the invention.

In a preferred embodiment, as shown in FIG. 2, the heat exchange station portion may not contain the high temperature water storing tank 7, at this operating mode, although during the periods of the electrical load trough, electrical load peak and electrical load peak, the heat exchange station portion provides different amount of heat supply, the thermal inertia of buildings may be used to maintain indoor temperature for human body comfort:

During the electrical load trough period: in the heat exchange station portion, the valve 30, the valve 33, the valve 35 are closed; the other valves and the circulating water pump 37 are open; the heat exchange station portion no longer stores the primary network high temperature supply water; the primary network high temperature supply water directly flows through the plat-type heat exchanger 10 and is mixed with the middle temperature water stored in the low temperature water storing tank 8 that is pressed from the top outlet, and then the mixed water flows into the evaporator of the electric heat pump 9; after heat exchanged and cooled, the mixed water is divided into two branches, one of which is directed into the low temperature water storing tank 8 from the bottom inlet by the circulating water pump 37, the other of which flows into the primary network backwater pipe 1-1. Meanwhile, the secondary network low temperature backwater provided by the secondary network water supply pipe 1-3 firstly flows through the secondary network side of the plat-type heat exchanger 10; after heat exchanged and heated, the secondary network low temperature backwater flows into the condenser of the electric heat pump 9; after further heat exchanging and heating the secondary network low temperature backwater, the secondary network high temperature supply water is obtained, which flows into the secondary network water supply pipe 1-4 for supplying to the heat users, wherein the electric heat pump 9 operates at full capacity.

During the electrical load flat period, in the heat exchange station portion, the valve 29, the valve 30, the valve 33, the valve 35 and the circulating water pump 37 are closed and the other valves are open; the low temperature water storing tank 8 no longer participate in heat storing or exothermic process; the primary network high temperature supply water provided by the primary network water supply pipe 1-2 flows through the primary network side of the plate-type heat exchanger 10 and the evaporator of the electric heat pump 9 successively; after heat exchanging and cooling the primary network high temperature supply water, the primary network low temperature backwater is obtained, which flows into the primary network backwater pipe 1-1. Meanwhile, the secondary network low temperature backwater provided by the secondary network backwater pipe 1-3 flows through the secondary network side of the plate-type heat exchanger 10 and the condenser of the electric heat pump 9 successively; after heat exchanging and heating the primary network high temperature supply water, the secondary network high temperature supply water is obtained, which flows into the secondary network water supply pipe 1-4 for supplying to the heat users, now the electric heat pump 9 operates at part of capacity.

During electrical load peak period, in the heat exchange station portion, the valve 28, the valve 29, the valve 31, the valve 33, the valve 34 and the circulating water pump 37 are closed; the electric heat pump 9 is shut down; and the other valves are open; the primary network high temperature supply water provided by the primary network water supply pipe 1-2 flows through the primary network side of the plate-type heat exchanger 10, and after heat exchanged and cooled, all of which flows into the low temperature water storing tank 8; in turn the low temperature water stored in the low temperature water storing tank 8 is pressed from the bottom outlet and is sent to the primary network backwater pipe 1-1. Meanwhile, the secondary network low temperature backwater provided by the secondary network backwater pipe 1-3 flows through the secondary network side of the plate-type heat exchanger 10; and after heat exchanging and heating the secondary network low temperature backwater, the secondary network high temperature supply water is obtained, which flows into the secondary network water supply pipe 1-4 for supplying to the heat users.

The embodiments described above are only intended to further illustrate the object, technical solution and benefits of the invention in details, not for limiting the invention. Any modification, equivalent replacement and improvement that are made within the spirit and principle of the invention should be included within the scope of the invention.

The invention claimed is:
1. An electric peaking combined heat and power (CHP) waste heat recovery device, comprising:
  an inner power plant portion; and
  a heat exchange station portion;

wherein the inner power plant portion comprises a first heat exchanger (1), a waste heat recovery electric heat pump (2), an energy-storing electric heat pump (3), a first high temperature water storing tank (4), a first low temperature water storing tank (5), a heating network heater (6), a first to 9th valves (11-19) and a first to 4th circulating water pumps (20-23); wherein an inlet of the first heat exchanger (1) is connected to a primary network backwater pipe (1-1), and an outlet of the first heat exchanger (1) is connected to inlets of the first valve (11), the second valve (12) and the first circulating water pump (20) in parallel, respectively; an inlet of the waste heat recovery electric heat pump (2) is connected to an outlet of the second valve (12), and an outlet of the waste heat recovery electric heat pump (2) is connected to an inlet of the heating network heater (6); a top inlet/outlet of the first high temperature water storing tank (4) is connected to an outlet of the third valve (13) and an inlet of the 4th valve (14) in parallel, respectively, an inlet of the third valve (13) is connected to an outlet of a condenser of the energy-storing electric heat pump (3) and an outlet of the 4th valve (14) is connected to the inlet of the heating network heater (6); a bottom inlet/outlet of the first high temperature water storing tank (4) is connected to an outlet of the 5th valve (15) and an inlet of the second circulating water pump (21) in parallel, respectively, an inlet of the 5th valve (15) is connected to an outlet of the first circulating water pump (20), and an outlet of the second circulating water pump (21) is connected to an inlet of the condenser of the energy-storing electric heat pump (3) via the 6th valve (16); a top inlet/outlet of the first low temperature water storing tank (5) is connected to an outlet of the first valve (11) and an inlet of the 7th valve (17) in parallel, respectively, and an outlet of the 7th valve (17) is connected to an inlet of an evaporator of the energy-storing electric heat pump (3); a bottom inlet/outlet of the first low temperature water storing tank (5) is connected to an outlet of the 8th valve (18) and an inlet of the third circulating water pump (22) in parallel, respectively, an inlet of the 8th valve (18) is connected to an outlet of the evaporator of the energy-storing electric heat pump (3) via the 4th circulating water pump (23), and an outlet of the third circulating water pump (22) is connected to the inlet of the first heat exchanger (1) in parallel via the 9th valve (19);

wherein the heat exchange station portion comprises a second high temperature water storing tank (7), a second low temperature water storing tank (8), an electric heat pump (9), a second heat exchanger (10), a 10th to 21st valves (24-35) and a 5th to 6th circulating water pumps (36-37); wherein a top inlet/outlet of the second high temperature water storing tank (7) is connected to an outlet of the 10th valve (24) and an inlet of the 5th circulating water pump (36) in parallel, respectively, an inlet of the 10th valve (24) is connected to an outlet of the heating network heater (6) via a primary network water supply pipe (1-2), an outlet of the 5th circulating water pump (36) connected to the primary network water supply pipe (1-2) in parallel via the 11th valve (25) is connected to an inlet of the 12th valve (26), and an outlet of the 12th valve (26) is connected to an inlet of a primary network of the second heat exchanger (10); a bottom inlet/outlet of the second high temperature water storing tank (7) is connected to an outlet of the 13th valve (27) and an inlet of the 14th valve (28) in parallel, respectively, an inlet of the 13th valve (27) is connected to an outlet of the primary network of the second heat exchanger (10), and an outlet of the 14th valve (28) is connected to an inlet of an evaporator of the electric heat pump (9); a top inlet/outlet of the second low temperature water storing tank (8) is also connected to the outlet of the 13th valve (27) and the inlet of the 14th valve (28) in parallel, respectively, a bottom inlet/outlet of the second low temperature water storing tank (8) is connected to an outlet of the 15th valve (29) and an inlet of the 16th valve (30) in parallel, respectively, and an outlet of the 16th valve (30) is connected to the primary network backwater pipe (1-1); an outlet of the evaporator of the electric heat pump (9) is connected to an inlet of the 6th circulating water pump (37) and the primary network backwater pipe (1-1) in parallel via the 17th valve (31), respectively, and an outlet of the 6th circulating water pump (37) is connected to an inlet of the 15th valve (29); a secondary network backwater pipe (1-3) is connected to inlets of the 18th valve (32) and the 19th valve (33) in parallel, respectively, an outlet of the 18th valve (32) is connected to an inlet of the secondary network of the second heat exchanger (10), both outlets of the 19th valve (33) and the secondary network of the second heat exchanger (10) are connected to inlets of the 20th valve (34) and the 21st valve (35) in parallel, respectively, an outlet of the 21st valve (35) is connected to a secondary network water supply pipe (1-4), an outlet of the 20th valve (34) is connected to an inlet of a condenser of the electric heat pump (9), and an outlet of the condenser of the electric heat pump (9) is connected to the secondary network water supply pipe (1-4).

2. The electric peaking combined heat and power (CHP) waste heat recovery device of claim 1, wherein the first heat exchanger (1) comprises a condenser or a water-water heat exchanger.

3. The waste heat recovery device for power peak load regulation and combined heat and power (CHP) of claim 1, wherein the second heat exchanger (10) comprises a plate-type heat exchanger or an absorption-type heat exchanger unit.

4. An electric peaking combined heat and power (CHP) waste heat recovery device, comprising an inner power plant portion and a heat exchange station portion, wherein the inner power plant portion comprises a first heat exchanger (1), a waste heat recovery electric heat pump (2), an energy-storing electric heat pump (3), a first high temperature water storing tank (4), a first low temperature water storing tank (5), a heating network heater (6), a first to 9th valves (11-19) and a first to 4th circulating water pumps (20-23); wherein an inlet of the first heat exchanger (1) is connected to a primary network backwater pipe (1-1), and an outlet of the first heat exchanger (1) is connected to inlets of the first valve (11), the second valve (12) and the first circulating water pump (20) in parallel, respectively; an inlet of the waste heat recovery electric heat pump (2) is connected to an outlet of the second valve (12), and an outlet of the waste heat recovery electric heat pump (2) is connected to an inlet of the heating network heater (6); a top inlet/outlet of the first high temperature water storing tank (4) is connected to an outlet of the third valve (13) and an inlet of the 4th valve (14) in parallel, respectively, an inlet of the third valve (13) is connected to an outlet of a condenser of the energy-storing electric heat pump (3) and an outlet of the 4th valve (14) is connected to the inlet of the heating network heater (6); a bottom inlet/outlet of the first high temperature water storing tank is connected to an outlet of the 5th valve (15) and an inlet of the second circulating water pump (21) in parallel, respectively, an inlet of the 5th valve (15) is connected to an outlet of the first circulating water pump (20), and an outlet of the second circulating water pump (21) is connected to an inlet of the condenser of the energy-storing electric heat pump (3) via the 6th valve (16); a top inlet/outlet of the first low temperature water storing tank (5) is connected to an outlet of the first valve (11) and an inlet of the 7th valve (17) in parallel, respectively, and an outlet of the 7th valve (17) is connected to an inlet of an evaporator of the energy-storing electric heat pump (3); a bottom inlet/outlet of the first low temperature water storing tank (5) is connected to an outlet of the 8th valve (18) and an inlet of the third circulating water pump (22) in parallel, respectively, an inlet of the 8th valve (18) is connected to an outlet of the evaporator of the energy-storing electric heat pump (3) via the 4th circulating water pump (23), and an outlet of the third circulating water pump (22) is connected to the inlet of the first heat exchanger (1) in parallel via the 9th valve (19); wherein the heat exchange station portion comprises a second low temperature water storing tank (8), an electric heat pump (9), a second heat exchanger (10), a 12th to 21st valves (26-35) and a 6th circulating water pump (37); wherein an inlet of the 12th valve (26) is connected to an outlet of the heating network heater (6) via a primary network water supply pipe (1-2); an outlet of the 12th valve (26) is connected to an inlet of a primary network of the second heat exchanger (10); a top inlet/outlet of the second low temperature water storing tank (8) is connected to an outlet of the 13th valve (27) and an inlet of the 14th valve (28) in parallel, respectively; an inlet of the 13th valve (27) is connected to an outlet of the primary network of the second heat exchanger (10), and an outlet of the 14th valve (28) is connected to an inlet of an evaporator of the electric heat pump (9); a bottom inlet/outlet of the second low temperature water storing tank (8) is connected to an outlet of the 15th valve (29) and an inlet of the 16th valve (30) in parallel, respectively, and an outlet of the 16th valve (30) is connected to the primary network backwater pipe (1-1); an outlet of the evaporator of the electric heat pump (9) is connected to an inlet of the 6th circulating water pump (37) and the primary network backwater pipe (1-1) in parallel via the 17th valve (31), respectively, and an outlet of the 6th circulating water pump (37) is connected to an inlet of the 15th valve (29); a secondary network backwater pipe (1-3) is connected to inlets of the 18th valve (32) and the 19th valve (33) in parallel, respectively, an outlet of the 18th valve (32) is connected to an inlet of a secondary network of the second heat exchanger (10), both outlets of the 19th valve (33) and the secondary network of the second heat exchanger (10) are connected to inlets of the 20th valve (34) and the 21st valve (35) in parallel, respectively, an outlet of the 21st valve (35) is connected to a secondary network water supply pipe (1-4), an outlet of the valve (34) is connected to an inlet of a condenser of the electric heat pump (9), and an outlet of the condenser of the electric heat pump (9) is connected to the secondary network water supply pipe (1-4).

5. The electric peaking combined heat and power (CHP) waste heat recovery device of claim 4, wherein the first heat exchanger (1) comprises a condenser or a water-water heat exchanger.

6. The electric peaking combined heat and power (CHP) waste heat recovery device of claim 4, wherein the second heat exchanger (10) comprises a plate-type heat exchanger or an absorption-type heat exchanger unit.

7. An operating method for the electric peaking combined heat and power (CHP) waste heat recovery device of claim 1, wherein the operating method adjusts operating modes of the device through combination of different valve switches such that the device is configured to operate in one of a plurality of operating modes during trough load, flat load, and peak load periods, the method comprising:

1) during the trough load period, in the inner power plant portion, the first valve (11), the 4th valve (14), the 5th valve (15), the 9th valve (19), the first circulating water pump (20) and the third circulating water pump (22) are closed; the second valve (12), the third valve (13), the 6th valve (16), the 7th valve (17), the 8th valve (18), the second circulating water pump (21) and the 4th circulating water pump (23) are open; primary network low temperature backwater provided by the primary network backwater pipe (1-1) flows into the first heat exchanger (1) and the waste heat recovery electric heat pump (2) successively; the first heat exchanger (1) and the waste heat recovery electric heat pump (2) recover exhaust waste heat of the combined heat and power (CHP) unit to heat the primary network low temperature backwater; the heated heating network water from the waste heat recovery electric heat pump (4) flows into the heating network heater (6), wherein the heated heating network water is steam extracted and heated by the combined heat and power (CHP) unit to a heating network design temperature to obtain primary network high temperature supply water flowing into the primary network water supply pipe (1-2) which supplies the primary network high temperature supply water; meanwhile, water stored in the first high temperature water storing tank (4) is drawn from the bottom outlet via the second circulating water pump (21) and flows into the condenser of the energy-storing electric heat pump (3); and after heat exchanged and heated, the water flows back into the first high temperature water storing tank (4) from the top inlet; water stored in the first low temperature water storing tank (5) is pressed from the top outlet and flows into the evaporator of the energy-storing electric heat pump (3), and after heat exchanged and cooled, the water is directed into the first low temperature water storing tank (5) from the bottom inlet via the 4th circulating water pump (23);

in the heat exchange station portion, the 11th valve (25), the 12th valve (26), the 13th valve (27), the 16th valve (30), the 18th valve (32), the 21st valve (35) and the 5th circulating water pump (36) are closed; the other valves and the 6th circulating water pump (37) are open; primary network high temperature supply water provided by the primary network water supply pipe (1-2) flows into the second high temperature water storing tank (7) from the top inlet; the high temperature supply water is stored in the second high temperature water storing tank (7), thus pressing middle temperature water stored in the second high temperature water storing tank (7) from the bottom outlet and is mixed with middle temperature stored water pressed from the top outlet of the second low temperature water storing tank (8); then the mixed water flows into the evaporator of the electric heat pump (9); after heat exchanged and cooled, the mixed water is divided into two branches, one of which is directed into the second low temperature water storing tank (8) from the bottom inlet via the 6th circulating water pump (37), and the other of which flows into the primary network backwater pipe (1-1); meanwhile, secondary network low temperature backwater provided by the secondary network water supply pipe (1-3) flows through the condenser of the electric heat pump (9); and after heat exchanging and heating the secondary network low temperature backwater, secondary network high temperature supply water is obtained, which flows into the secondary network water supply pipe (1-4) for supplying to heat users;

2) during the flat load period, in the inner power plant portion, the 6th valve (16), the 8th valve (18), the second circulating water pump (21) and the 4th circulating water pump (23) are closed; the energy-storing electric heat pump (3) is shut down; and the other parts operates in the same way as that during the trough load period;

in the heat exchange station portion, the 10th valve (24), the 11th valve (25), the 15th valve (29), the 16th valve (30), the 19th valve (33), the 21st valve (35) and the 6th circulating water pump (37) are closed; the other valves and the 5th circulating water pump (36) are open; primary network high temperature supply water provided by the primary network water supply pipe (1-2) flows through a primary network side of the second heat exchanger (10) and the evaporator of the electric heat pump (9) successively; after heat exchanging and cooling the primary network high temperature supply water, primary network low temperature backwater is obtained, which flows into the primary network backwater pipe (1-1); meanwhile, secondary network low temperature backwater provided by the secondary network backwater pipe (1-3) flows through a secondary network side of the second heat exchanger (10) and the condenser of the electric heat pump (9) successively; and after heat exchanging and heating the secondary network low temperature backwater, secondary network high temperature supply water is obtained, which flows into the secondary network water supply pipe (1-4) for supplying to the heat users;

3) during peak load period, in the inner power plant portion, the second valve (12), the third valve (13), the 6th valve (16), the 7th valve (17), the 8th valve (18), the second circulating water pump (21) and the 4th circulating water pump (23) are closed; the first valve (11), the 4th valve (14), the 5th valve (15), the 9th valve (19), the first circulating water pump (20) and the third circulating water pump (22) are open; low temperature water stored in the first low temperature water storing tank is drawn from the bottom outlet and is mixed with the primary network low temperature backwater, and then the low temperature mixed water is sent to first heat exchanger (1); the first heat exchanger (1) recovers the exhaust waste heat of the combined heat and power (CHP) unit to heat the low temperature mixed water; the heated heating network water by the first heat exchanger (1) is divided into two branches, one of which returns back into the first low temperature water storing tank (5) from the top inlet, the other of which is directed into the first high temperature water storing tank (4) from the bottom inlet via the first circulating water pump (20); and high temperature water stored in the first high temperature water storing tank (4) is pressed from the top outlet and then is sent to the heating network heater (6); wherein the high temperature water is steam extracted and heated by the combined heat and power (CHP) unit to a heating network design temperature to obtain the primary network high temperature supply water flowing into the primary network water supply pipe (1-2) which supplies the primary network high temperature supply water;

in the heat exchange station portion, the 10th valve (24), the 14th valve (28), the 15th valve (29), the 17th valve (31), the 19th valve (33), the 20th valve (34) and the 6th circulating water pump (37) are closed; the electric heat pump (9) is shut down; the other valves and the 5th circulating water pump (36) are open; high temperature water stored in the second high temperature water storing tank (7) is drawn from the top outlet by the 5th circulating water pump (36) and is mixed with the primary network high temperature supply water provided by the primary network water supply pipe (1-2); and then the mixed water flows through the primary network side of the second heat exchanger (10); after heat exchanging and cooling the mixed water, middle temperature water is obtained and divided into two branches, one of which flows into the second high temperature water storing tank (7) from the bottom inlet, the other of which flows into the second low temperature water storing tank (8) from the top inlet, thus pressing low temperature water stored in the second low temperature water storing tank (8) from the bottom outlet; the pressed low temperature water flows into the primary network backwater pipe (1-1); meanwhile, the secondary low temperature backwater provided by the secondary network backwater pipe (1-3) flows through the secondary network side of the second heat exchanger (10); and after heat exchanging and heating the secondary low temperature backwater, secondary network high temperature supply water is obtained, which flows into the secondary network water supply pipe (1-4) for supplying to the heat users.

8. An operating method for the electric peaking combined heat and power (CHP) waste heat recovery device of claim 4, wherein the operating method adjusts operating modes of the device through combination of different valve switches such that the device is configured to operate in one of a plurality of operating modes during trough load, flat load, and peak load periods, the method comprising:

1) during the trough load period, in the inner power plant portion, the first valve (11), the 4th valve (14), the 5th valve (15), the 9th valve (19), the first circulating water pump (20) and the third circulating water pump (22) are closed; the second valve (12), the third valve (13), the 6th valve (16), the 7th valve (17), the 8th valve (18), the second circulating water pump (21) and the 4th circulating water pump (23) are open; primary network low temperature backwater provided by the primary network backwater pipe (1-1) flows into the first heat exchanger (1) and the waste heat recovery electric heat pump (2) successively; the first heat exchanger (1) and the waste heat recovery electric heat pump (2) recover exhaust waste heat of the combined heat and power (CHP) unit to heat the primary network low temperature backwater; the heated heating network water from the waste heat recovery electric heat pump (4) flows into the heating network heater (6), wherein the heated heating network water is steam extracted and heated by the combined heat and power (CHP) unit to a heating network design temperature to obtain primary network high temperature supply water flowing into the primary network water supply pipe (1-2) which supplies the primary network high temperature supply water; meanwhile, water stored in the high temperature water storing tank (4) is drawn from the bottom outlet via the second circulating water pump (21) and flows into the condenser of the energy-storing electric heat pump (3); and after heat exchanged and heated, the water flows back into the first high temperature water storing tank (4) from the top inlet; water stored in the first low temperature water storing tank (5) is pressed from the top outlet and flows into the evaporator of the energy-storing electric heat pump (3), and after heat exchanged and cooled, the water is directed into the first low temperature water storing tank (5) from the bottom inlet via the 4th circulating water pump (23);

in the heat exchange station portion, the 16th valve (30), the 19th valve (33), the 21st valve (35) are closed; the other valves and the 6th circulating water pump (37) are open; primary network high temperature supply water provided by the primary network water supply pipe (1-2) first flows through a primary network side of the second heat exchanger (10); and after heat exchanged and cooled, the primary network high temperature supply water is mixed with middle temperature stored water pressed from the top outlet of the second low temperature water storing tank (8), then the mixed water flows through the evaporator of the electric heat pump (9); after further heat exchanged and cooled, the mixed water is divided into two branches, one of which is directed into the second low temperature water storing tank (8) from the bottom inlet by the 6th circulating water pump (37), the other of which flows into the primary network backwater pipe (1-1); meanwhile, secondary network low temperature backwater provided by the secondary network water supply pipe (1-3) first flows through a secondary network side of the second heat exchanger (10); after heat exchanged and heated, the secondary network low temperature backwater flows into the condenser of the electric heat pump (9); after further heat exchanging and heating the secondary network low temperature backwater, secondary network high temperature supply water is obtained, which flows into the secondary network water supply pipe (1-4) for supplying to heat users;

2) during the flat load period, in the inner power plant portion, the 6th valve (16), the 8th valve (18), the second circulating water pump (21) and the 4th circulating water pump (23) are closed; the energy-storing electric heat pump (3) is shut down, and the other parts operate in the same way as that during the trough load period;

in the heat exchange station portion, the 15th valve (29), the 16th valve (30), the 19th valve (33), the 21st valve (35) and the 6th circulating water pump (37) are closed; the other valves are open; primary network high temperature supply water provided by the primary network water supply pipe (1-2) flows through the primary network side of the second heat exchanger (10) and the evaporator of the electric heat pump (9) successively, after heat exchanging and cooling the primary network high temperature supply water, the primary network low temperature backwater is obtained, which flows into the primary network backwater pipe (1-1); meanwhile, secondary network low temperature backwater provided by the secondary network backwater pipe (1-3) flows through a secondary network side of the second heat exchanger (10) and the condenser of the electric heat pump (9) successively; and after heat exchanging and heating the secondary network low temperature backwater, secondary network high temperature supply water is obtained, which flows into the secondary network water supply pipe (1-4) for supplying to the heat users;

3) during the peak load period, in the inner power plant portion, the second valve (12), the third valve (13), the 6th valve (16), the 7th valve (17), the 8th valve (18), the second circulating water pump (21) and the 4th circulating water pump (23) are closed; the first valve (11), the 4th valve (14), the 5th valve (15), the 9th valve (19), the first circulating water pump (20) and the third circulating water pump (22) are open; low temperature water stored in the first low temperature water storing tank (5) is drawn from the bottom outlet and is mixed with the primary network low temperature backwater, and then the low temperature mixed water is sent to the first heat exchanger (1); the first heat exchanger (1) recovers the exhaust waste heat of the combined heat and power (CHP) unit to heat the low temperature mixed water; the heated heating network water by the first heat exchanger (1) is divided into two branches, one of which returns back into the first low temperature water storing tank (5) from the top inlet, the other of which is directed into the first high temperature water storing tank (4) from the bottom inlet via the first circulating water pump (20); and high temperature water stored in the first high temperature water storing tank (4) is pressed from the top outlet and then is sent to the heating network heater (6); wherein the high temperature water is steam extracted and heated by the combined heat and power (CHP) unit to a heating network design temperature to obtain the primary network high temperature supply water flowing into the primary network water supply pipe (1-2) which supplies the primary network high temperature supply water;

in the heat exchange station portion, the 14th valve (28), the 15th valve (29), the 17th valve (31), the 19th valve (33), the 20th valve (34) and the 6th circulating water pump (37) are closed; the electric heat pump (9) is shut down; the other valves are open; the primary network high temperature supply water provided by the primary network water supply pipe (1-2) flows through the primary network side of the second heat exchanger (10), and flows into the second low temperature water storing tank (8) after heat exchanged and cooled; the low temperature water stored in the second low temperature water storing tank (8) is pressed from the bottom outlet and is sent to the primary network backwater pipe (1-1); meanwhile, the secondary network low temperature backwater provided by the secondary network backwater pipe (1-3) flows through the secondary network side of the second heat exchanger (10), and after heat exchanging and heating the secondary network low temperature backwater, the secondary network high temperature supply water is obtained, which flows into the secondary network water supply pipe (1-4) for supplying to the heat users.

\* \* \* \* \*